Nov. 29, 1949     C. J. KOCINSKI     2,489,901
ICE SHIELD
Filed Dec. 15, 1945     2 Sheets-Sheet 1
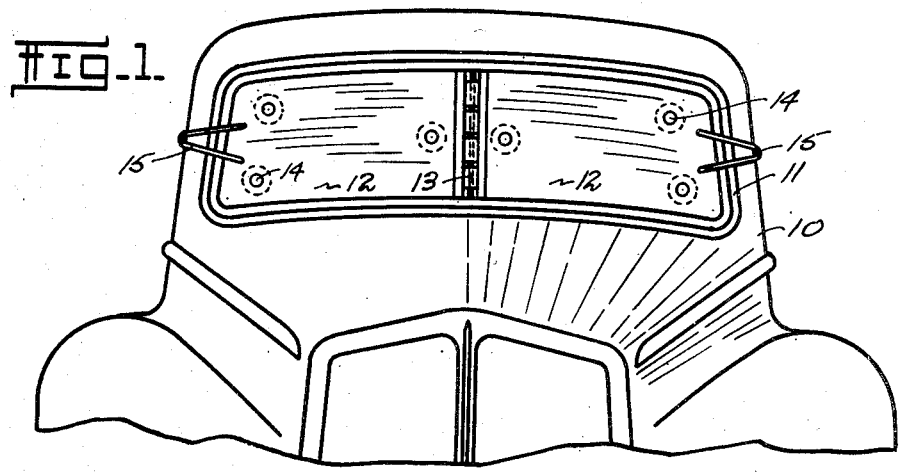
Fig. 1.
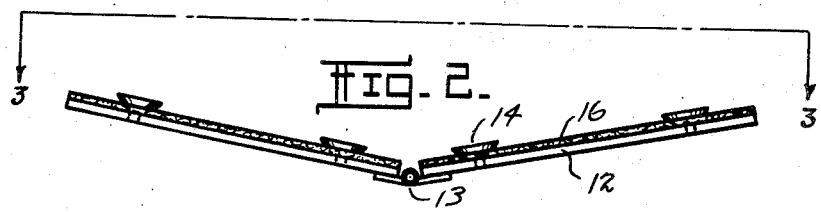
Fig. 2.
Fig. 3.
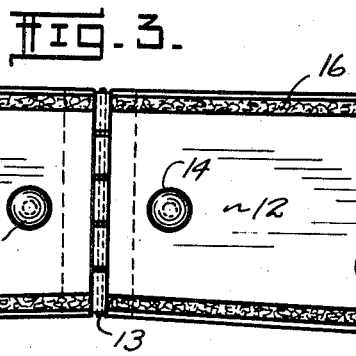
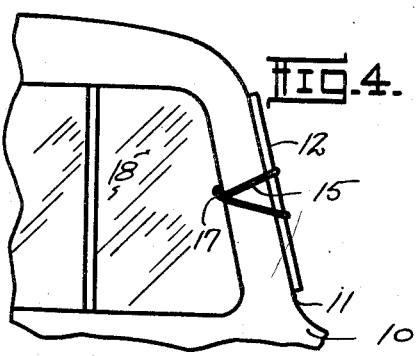
Fig. 4.
Chester J. Kocinski.
INVENTOR.
BY W. B. Harpman
ATTORNEY.

Nov. 29, 1949 C. J. KOCINSKI 2,489,901
ICE SHIELD
Filed Dec. 15, 1945 2 Sheets-Sheet 2
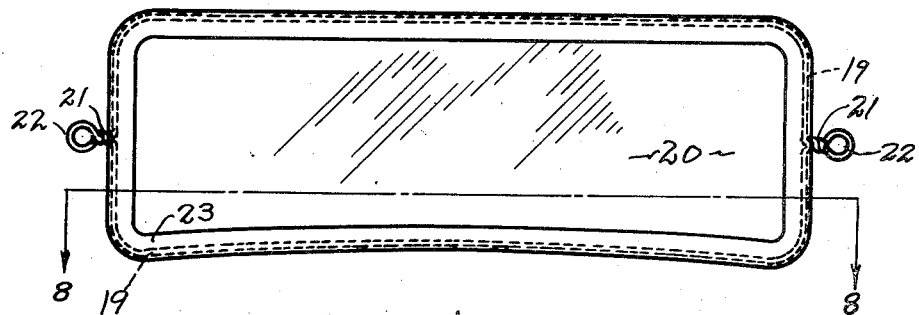
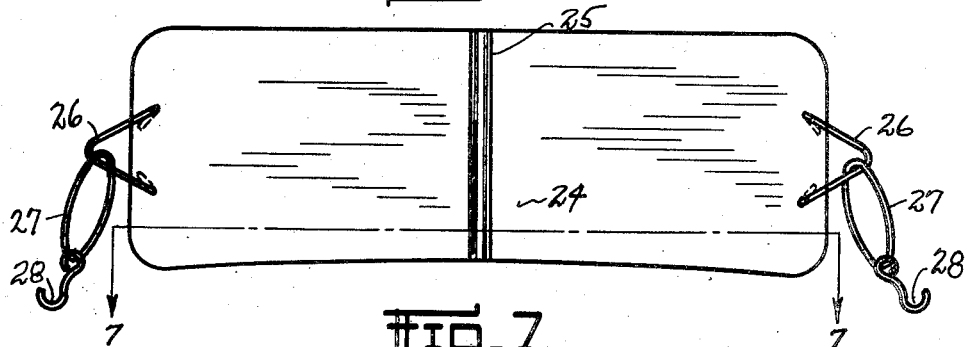
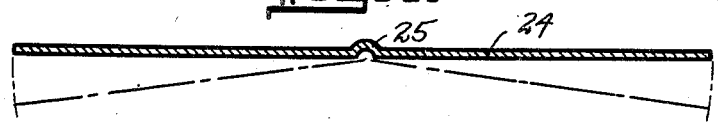
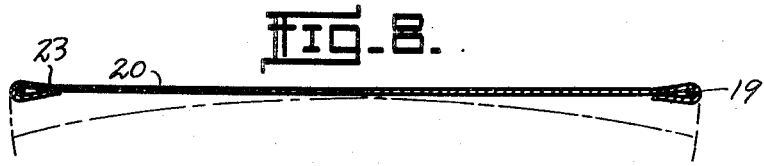
Chester J. Kocinski.
INVENTOR.
BY W. B. Harpman
ATTORNEY.

Patented Nov. 29, 1949

2,489,901

UNITED STATES PATENT OFFICE 2,489,901

ICE SHIELD

Chester J. Kocinski, Struthers, Ohio

Application December 15, 1945, Serial No. 635,218

2 Claims. (Cl. 296—84)

1

This invention relates to an ice shield and more particularly to a shield-like accessory for application to wind shields of automotive vehicles.

The principal object of the invention is the provision of a shield for application to the wind shield of an automotive vehicle to prevent ice and sleet from forming thereon.

A further object of the invention is the provision of an ice shield for a wind shield of an automotive vehicle and means for affixing it to the automotive vehicle.

A still further object of the invention is the provision of a two-part ice shield for wind shields of automotive vehicles and means hinging the parts together so that they may conform to the semi-V-shaped contour of an automotive window construction.

A still further object of the invention is the provision of an ice shield for a wind shield of an automotive vehicle including means directly engageable with the wind shield for attaching the same thereto.

A still further object of the invention is the provision of an ice shield for a wind shield incorporating a frame and a transparent flexible covering therefor and means for affixing the shield to the wind shield of an automotive vehicle so that ice and sleet are prevented from forming directly on the wind shield and to provide for the removal of the ice and sleet by flexing of the shield itself.

The ice shield for automotive vehicle wind shields shown and described herein has been designed to form a simple and efficient means of preventing ice and sleet from forming on wind shields during winter months when automobiles are parked outdoors. It is well known that many automobiles are parked outdoors for considerable periods of time during the winter season and that great annoyance is caused the operator of an automobile by the formation of sleet and ice on the wind shield which obstructs the vision and often requires the forceful removal of the ice and sleet before the automobile can be driven. The present invention relates to a device to be applied to a wind shield, particularly while the automobile is parked, so that ice and sleet forming on the automobile will form on the protective device and not upon the wind shield. The ice shield may be removed when the automobile is to be driven or in one form of the invention it may be manually flexed or otherwise moved to cause the sleet and ice thereon to break off and thereby be removed.

With the foregoing and other objects in view

2 which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a front elevation of a portion of an automobile and shows an ice shield in position on the wind shield thereof.

Figure 2 is a top plan view of an ice shield formed in accordance with the invention.

Figure 3 is a back elevation of the ice shield illustrated in Figures 1 and 2.

Figure 4 is a side elevation of a portion of an automobile showing an ice shield in position thereon and means for attaching it thereto.

Figure 5 is a front plan view of a modified form of the ice shield and discloses a device formed of transparent flexible sheeting material on a suitable frame.

Figure 6 is a front plan view of a further modification of the ice shield which shows the same formed of a single piece of treated cardboard.

Figure 7 is a cross sectional elevation of the ice shield taken on line 7—7 of Figure 6.

Figure 8 is a cross sectional elevation of the ice shield taken on line 8—8 of Figure 5. Broken lines on Figures 7 and 8 indicate the shape of the ice shield in position on a curved or bowed wind shield.

By referring to the drawings and Figures 1, 2, 3 and 4 in particular, it will be observed that an automobile is indicated by the numeral 10 and that the wind shield thereof is defined by a frame 11. An ice shield 12 is shown in position thereon, the ice shield being formed of two similarly shaped sections of suitable material hinged to one another as by means of a hinge construction 13. The hinge construction 13 is vertically positioned and thereby enables the ice shield 12 to be positioned on semi-V-shaped wind shield constructions. In Figures 1 and 2 of the drawings, methods of affixing the ice shield 12 to the automobile are shown, one of which consists of a plurality of vacuum cups 14 affixed to the back of the ice shield and the other of which consists of an elastic cord and hook arrangement 15 which are adapted to engage the window opening or door opening around the corner on the side of the automobile 10. It will be obvious that one or the other of the constructions for attaching the ice shield 12 to the automobile will be sufficient in actual practice.

In Figure 3 of the drawings a detailed view of the ice shield 12 is shown. A gasket 16 is illustrated as being formed around the edges of the back of the ice shield to cause it to tightly engage the wind shield it is protecting. The vacuum cups 14 are also shown in detail.

In Figure 4 of the drawings the alternate method of affixing the ice shield 12 to the wind shield area 11 of the automobile 10 is illustrated and the elastic cords 15 are shown in connection with a hook 17 which is engaged in one of the glass receiving channels normally holding and guiding a ventilator glass 18.

It will be obvious to those skilled in the art that various materials may be employed for the formation of the ice shield for application to automobile wind shields. In Figures 5 and 8 one such modification considered to come within the scope of this invention may be seen. In Figures 5 and 8 of the drawings a frame 19 of suitable material, such as wire, supports and shapes the ice shield which is largely formed of transparent flexible sheeting material 20. The frame 19 is preferably formed with some means of attachment at its sides so that elastic bands or hooks may be used to attach it to the automobile on which it is installed. In Figure 5 the wire frame 19 is shown twisted as at 21 to form eyelets 22 which serve as means for attaching suitable mounting cords or cables. As shown in Figure 8, the transparent flexible sheeting material 20 is positioned on the frame 19 in a manner known in the art by simply bending it back upon itself and affixing it thereto as by heat sealing or cementing. Such a seam is indicated in the drawings by the numeral 23.

By referring now to Figures 6 and 7 of the drawings, a further modification in the construction of the ice shield may be seen in which an ice shield 24 is formed of a single section of suitable material, such as cardboard treated as by waxing or oiling, to enable it to withstand the weather. The general outline and shape of the ice shield 24 is such as to enable it to be adapted to the majority of wind shield constructions in automobiles, and the centermost section thereof is formed with a vertical crease 25 which will enable the device to be bent for application to V-shaped or bowed wind shields. Simple metallic hooks 26 positioned one at each side thereof directly engage the material of the ice shield 24 and elastic cords 27 and secondary hooks 28 form a device capable of being attached to the wind shield area of an automobile.

It will thus be seen that a simple and efficient ice shield construction has been disclosed which may be effectively employed for protecting an automotive vehicle wind shield which in one form of the invention may be positioned on the wind shield and left thereon during the winter months and such ice and sleet as forms thereon may be removed by manual movement of the shield to flex the same and cause the ice and sleet to break away therefrom. The formation of the ice shield from single sections of semi-rigid, transparent material is intended to come within the scope of the disclosure herein made.

Having thus described my invention, what I claim is:

1. An ice shield for a motor vehicle windshield comprising a pair of rigid members shaped to correspond to the shape of the windshield and hinged to one another on a central vertical axis, and means for affixing the said shield to the said motor vehicle windshield in spaced relation thereto, said means comprising a plurality of vacuum cups located inwardly from the edges of the said shield and immediately adjacent the shield, and a plurality of elastic bands and fasteners secured to the said shield for engaging the said motor vehicle.

2. An ice shield for a motor vehicle windshield comprising a pair of semi-rigid members shaped to correspond to the shape of the windshield, and vacuum cups on the inner side of said shield for spacing the said shield with respect to the said motor vehicle windshield and for affixing the said shield to the said motor vehicle, and a raised edge portion formed on the said shield for engaging the said windshield and preventing snow and ice from moving thereinunder.

CHESTER J. KOCINSKI.

REFERENCES CITED

The following references are of record in the file of this patent:

UNITED STATES PATENTS

| Number | Name | Date |
| --- | --- | --- |
| 2,121,264 | Rubottom | June 21, 1938 |
| 2,223,145 | Wise | Nov. 26, 1940 |
| 2,331,600 | Dillow | Oct. 12, 1943 |
| 2,341,236 | Parkins | Feb. 8, 1944 |